(12) United States Patent
Singhal

(10) Patent No.: US 9,188,326 B2
(45) Date of Patent: Nov. 17, 2015

(54) APPARATUS AND METHOD FOR A ONE TOUCH LIGHT SECURITY FEATURE IN A MOBILE WIRELESS COMMUNICATION DEVICE

(71) Applicant: Tara Chand Singhal, Torrance, CA (US)

(72) Inventor: Tara Chand Singhal, Torrance, CA (US)

( * ) Notice: Subject to any disclaimer, the term of this patent is extended or adjusted under 35 U.S.C. 154(b) by 256 days.

(21) Appl. No.: 13/746,269

(22) Filed: Jan. 21, 2013

(65) Prior Publication Data

US 2014/0204214 A1 Jul. 24, 2014

Related U.S. Application Data

(60) Provisional application No. 61/752,089, filed on Jan. 14, 2013.

(51) Int. Cl.
*H04M 1/22* (2006.01)
*F21V 33/00* (2006.01)

(52) U.S. Cl.
CPC .............. *F21V 33/0052* (2013.01); *H04M 1/22* (2013.01)

(58) Field of Classification Search
CPC ........ H04M 1/21; H04M 1/22; F21V 33/0052
USPC ................. 348/370, 371; 362/88, 86, 109
See application file for complete search history.

(56) References Cited

U.S. PATENT DOCUMENTS

| | | | | |
|---|---|---|---|---|
| 5,901,206 A | * | 5/1999 | Soon ............................... | 362/88 |
| 6,254,249 B1 | * | 7/2001 | Kim et al. ....................... | 362/88 |
| 6,341,871 B1 | * | 1/2002 | Angelopoulos ................. | 362/88 |
| 6,711,005 B2 | * | 3/2004 | Martin ............................. | 362/88 |
| 6,755,549 B2 | * | 6/2004 | Rogers et al. ................... | 362/88 |
| 6,912,410 B2 | * | 6/2005 | Auten et al. .................... | 455/572 |
| 7,086,748 B1 | * | 8/2006 | Elembaby ........................ | 362/88 |
| 7,546,114 B1 | * | 6/2009 | Glaze, Jr. ........................ | 362/183 |
| 8,698,949 B2 | * | 4/2014 | Grunow et al. ................. | 348/371 |
| 2001/0024500 A1 | * | 9/2001 | Sharpe ............................ | 379/424 |
| 2002/0067608 A1 | * | 6/2002 | Kruse et al. .................... | 362/109 |
| 2004/0085745 A1 | * | 5/2004 | Yoshihara ....................... | 362/88 |
| 2005/0243198 A1 | * | 11/2005 | Pardikes ........................ | 348/370 |
| 2006/0189347 A1 | * | 8/2006 | Bollman et al. ........... | 455/556.1 |

FOREIGN PATENT DOCUMENTS

CN 2924942 Y * 7/2007
CN 201178438 Y * 1/2009

(Continued)

OTHER PUBLICATIONS

"iPhone User Guide for iOS 4.2 and 4.3 Software"; Apple, Inc.; Dec. 2011.*

(Continued)

*Primary Examiner* — John Villecco

(74) *Attorney, Agent, or Firm* — Steve Roeder, Esq

(57) ABSTRACT

A security feature in a handheld electronic wireless communication device, has two switch buttons A and B that are positioned on the bezel of the device that are for increasing/decreasing functions of the device. The device has a LED light used for flash light in a camera mode of the device. A device-logic, in a non-active state of the device, detects activations of the two switches in the non-active state of the device and uses the switch activations to control the LED light; thereby the logic enables quick response use of the LED light for security purposes.

16 Claims, 11 Drawing Sheets

(56) References Cited

FOREIGN PATENT DOCUMENTS

DE          10305476  A1  *  8/2004
FR           2799600  A1  *  4/2001
JP        2003032358  A   *  1/2003

OTHER PUBLICATIONS

"User Guide: Convoy 2"; Samsung Telecommunications America; Dec. 2011.*
"Nokia 100 User Guide"; Nokia; Dec. 2011.*
"Cat B100 Phone User Manual"; Caterpillar, Dec. 2014.*
"iPhone Customization"; iphone-tips-and-advice.com via archive.org; Dec. 27, 2012; <https://web.archive.org/web/20121227094204/http://www.iphone-tips-and-advice.com/iphone-customization.html>.*
"iPhone Flash Light"; iphone-tips-and-advice.com via archive.org; Nov. 13, 2012; <https://web.archive.org/web/20121113143706/http://www.iphone-tips-and-advice.com/iphone-flash-light.html>.*
"iOS Jailbreaking"; in Wikipedia, Retrieved Apr. 23, 2015, from http://en.wikipedia.org/wiki/IOS_jailbreaking.*
"Rulemaking on Exemptions from Prohibitions on Circumventions of Technological Measures that Control Access to Copyrighted works"; Retrieved from Copyright.gov; Apr. 23, 2015; from http://copyright.gov/1201/2010.*

* cited by examiner

Logic 24A

1. Detect double quick switch activation on either switch A or switch B
2. Check device is on non-active (0ff) state
3. Turn LED light on
4. When LED is on state, detect switch activation A and increase light intensity.
5. When LED is on state, detect switch activation B and decrease light intensity.
6. Save light intensity.
7. Use the saved light intensity when light turned on in step 3. Alternatively use full light intensity when light turned on in step 3.
8. Detect double quick switch activation on either switch A or switch B.
9. Turn LED light of

Figure 2A

Logic 24B

1. Detect double quick switch activation on either switch A or switch B
2. De-activate switch A/B ringer/volume control
3. Check device is on active state and NOT in Camera Mode
4. Turn LED light on
5. When LED is on state, detect switch activation A and increase light intensity
6. When LED is on state, detect switch activation B and decrease light intensity.
7. Save previous light intensity.
8. Use the saved light intensity when light turned on in step 3. Alternatively use full light intensity when light turned on in step 3.
9. Detect double quick switch activation on either switch A or switch B.
10. Turn LED light off.
11. Activate switch A/B ringer/volume control

Figure 2B

At step 80, having two switch buttons A and B on the device and positioning them on the bezel of the device for use in increasing/decreasing functions of the device.

At step 82, having an LED light in the device used for flash light in a camera mode of the device.

At step 84, having logic in the device, the logic in a non-active state of the device, detecting activations of the two switches in the non-active state of the device and using the switch activations to control the LED light, thereby enabling quick response use of the LED light for security purposes in the device.

At step 86, performing quick double switch activations with either switch A or switch B for turning the LED light on.

At step 88, performing quick double switch activations on either switch A or switch B, when the light is in ON state, for turning the LED light off.

At step 90, increasing the light intensity on switch A activation and decreasing the light intensity on switch B activation, when the light is in ON state.

At step 92, saving by the logic the last intensity in the memory associated with the logic.

At step 94, using by the logic the saved intensity to turn the lights on.

At step 96, turning the LED light on at full intensity

At step 98, a logic in the device that when the device is in an active state, without the camera function being selected, the logic detects quick double activations of any of the two switches on the device in an active state, turns off the ringer/volume control off and uses these quick double activations to control the LED light, thereby rapidly use the device in a light on/off mode for security purposes.

Figure 5A

At step 100, positioning on the bezel of the device such as a smart phone, a switch.

At step 102, having by the device a LED light used for flash light in a camera mode of the device.

At step 104, detecting activation of the switch by a logic using the switch activation to control the LED light a logic in the device, thereby the logic enabling quick response use of the LED light for security purposes.

At step 106, turning the LED light on by quick double switch activations.

At step 108, turning the LED light off, by quick double switch activations, when the light is in ON state.

Figure 5B

APPARATUS AND METHOD FOR A ONE TOUCH LIGHT SECURITY FEATURE IN A MOBILE WIRELESS COMMUNICATION DEVICE

CROSS REFERENCE

This application claims priority from provisional application Ser. No. 61/752,089 filed on Jan. 14, 2013, titled "Apparatus and method for a one touch light security feature in a mobile wireless communication device" of Tara Chand Singhal. The contents of application No. 61/752,089 are incorporated herein by reference.

FIELD OF THE INVENTION

A security feature in a handheld electronic wireless communication device, with the use of two switch buttons A and B that are positioned on the bezel of the device activates the LED light of the device. The security feature enables quick response use of the LED light for security purposes.

BACKGROUND

Wireless mobile communication devices, also known as smart phones, have become very common and have been acquired and are carried in their personal possession by the masses due to their low cost, convenience, and functionality. These wireless devices come equipped with features such as speakerphone, camera and GPS location.

Hence it is the objective of the embodiments herein to add more features in the mobile devices making them even more useful and convenient to the users of these devices.

SUMMARY

Mobile wireless communication devices, also known as smart phones, come equipped with many features. One of these features is a camera and a flash light for the camera in the form of an LED light. Another feature is a plurality of mechanical switches that are positioned on the bezel of the device.

What has been described here is with reference to an iPhone perspective. Other smart phones, made by many other manufacturers such as Motorola, Samsung, LG and Nokia have same and similar features as they relate to camera and flash light and switches on the bezel. Therefore the descriptions herein are not limited to any particular type of smart phone but to all types of smart phones with these features.

Also the description herein refers to LED light. LED stands for a specific type of technology called light emitting diode. LED light has become very popular in many applications including using it for a camera flash light given its form-factor and power consumption. Use of the word LED light in the specification does not rule out use of any other light emitting technology that may be used in the smart phones equipped with camera.

Generally there are four such switches that are positioned on the bezel of the device. In the iPhone, one is positioned on the top bezel and is used for turning the device on and off. Three of these switches are positioned on the left bezel of the device.

One of these three switches of the left side bezel is a slide switch that is used for changing between the vibration mode and the ringer mode of the device. There are two more switches that are positioned close to each other and are used for incrementing or decrementing the ringer/volume of the device.

Some of these switches operate when the device is in the ON state and some of these switches operate when the device is in the OFF state. Many of these switches generally are double function switches. That is, one switch is used for turning a function ON and the same switch is used for turning it OFF when in the ON state.

The two switches close to each other on the left bezel of iPhone® are used for incrementing and decrementing ringer/volume when the device is in the ON state. However these switches may be used when the device is in OFF state, for example to go to silent mode when a call is received.

The LED light is used in the camera mode of the device and can be in OFF mode, or single flash mode, or ON mode when for example, it is required in the camera movie mode.

It has been observed by the inventor and also believed that people find the LED light meant for a camera flash on a smart phone very useful to be used as general purpose light. However, to operate the LED as a general purpose light requires the device to be in ON state and the camera mode active and the flash turned on.

To obviate these steps and to use the LED light as a general purpose light, there is an Application that when installed on the iPhone® and when launched, the device being in the ON state, provides touch screen controls to manipulate the LED light, by turning it ON/OFF or varying the intensity of the light. This has turned out to be useful application for making a general purpose use of the LED light that was meant to be used for the camera.

However, it still requires the device to be in the ON state and the App to be launched and then touch screen activated to turn the LED light either ON or off. That is, to use the LED light requires at least three touch switch activations. These three touch screen actions would be (i) turn and unlock the device, (ii) launch the LED light APP, and (iii) to touch control the light to turn it either ON or OFF. The embodiments described herein, without adding any additional hardware, teach a one touch light feature in the mobile wireless communication devices.

The one touch light feature makes use of the switches on the bezel of the device to control the LED light without the device being in the ON state and activating the camera mode or relaying on app being downloaded in the device.

Thus by placing the control of the LED light on the already existing bezel situated mechanical switches make for a quick single action light on/off switch, that it is believed, comes in very useful to quickly turn on/off the light in emergency situations or in any situation when a quick access to a light would be handy. Thus a wireless communication device that had not been designed with a light would have a quick access handy light with the embodiments described herein.

There are three different embodiments that are described depending which of the bezel positioned switches are used. In one of the embodiments, a security feature in a handheld electronic wireless communication device, with the use of two prior art switch buttons A and B that are positioned on the bezel of the device activates the prior art LED light of the device and thus provides a one touch light security feature. This one touch light security feature enables quick response use of the LED light for security purposes. The one touch light security feature may be implemented by a logic that may be implemented either as a firmware or a software or a combination of firmware and software logic in a prior art wireless communication device.

The logic with the quick double switch activations on either switch A or switch B turns the LED light on. The logic with the quick double switch activation, on either switch A or switch B, when the LED light is in the ON state, turns the LED light off. Further, when the light is in ON state, switch A activation increases the light intensity and switch B interaction decreases the light intensity.

The logic saves the last intensity in the memory associated with the logic and the logic uses the saved intensity to turn the lights on. Alternatively, the LED light is turned on at full intensity.

These and other aspects of the embodiments herein are further described in detail with the help of the accompanying drawings and the description.

BRIEF DESCRIPTION OF THE DRAWINGS

Some of the novel features of the embodiments will be best understood from the accompanying drawings, taken in conjunction with the accompanying description, in which similar reference characters refer to similar parts, and in which:

FIGS. 2A-2B are block diagrams that illustrates features of a preferred embodiment of a one touch light logic.

FIGS. 5A-5B are method diagrams that illustrates features of a one touch light in a mobile wireless communication device.

DESCRIPTION

Figure 1A:
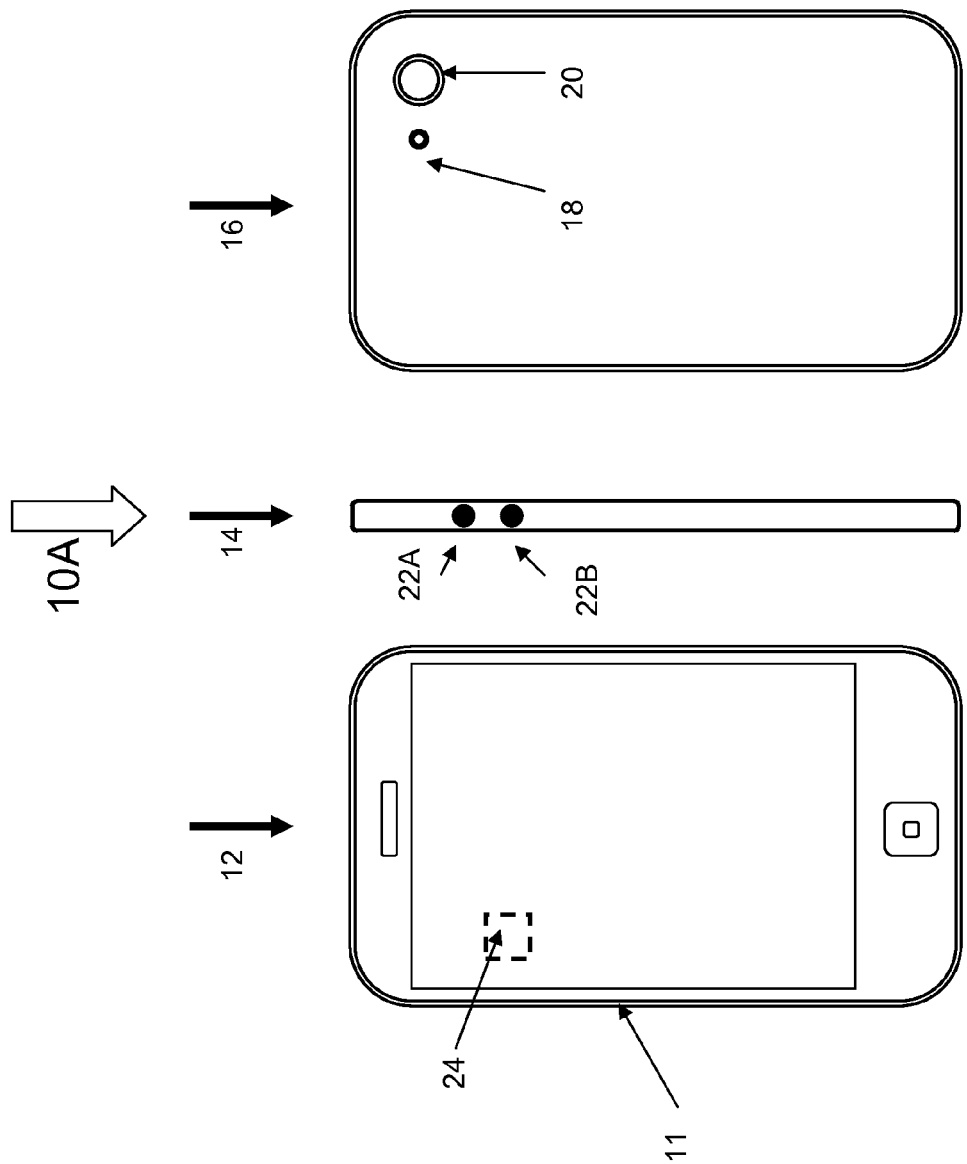
FIGS. 1A-1B-1C are block diagrams that illustrate features of a one touch light in a prior art mobile wireless communication device.
Figure 1B:
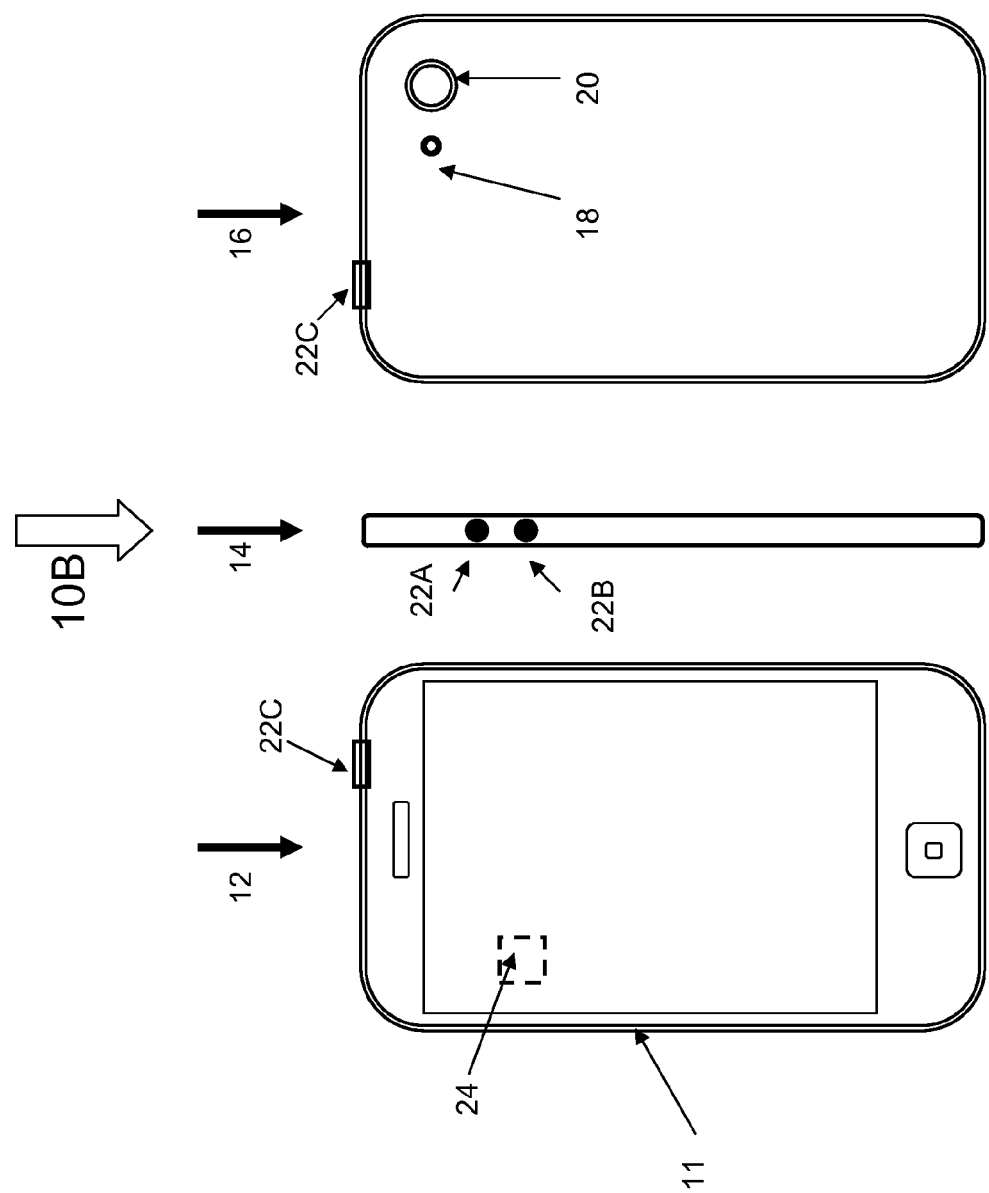
Figure 1C:
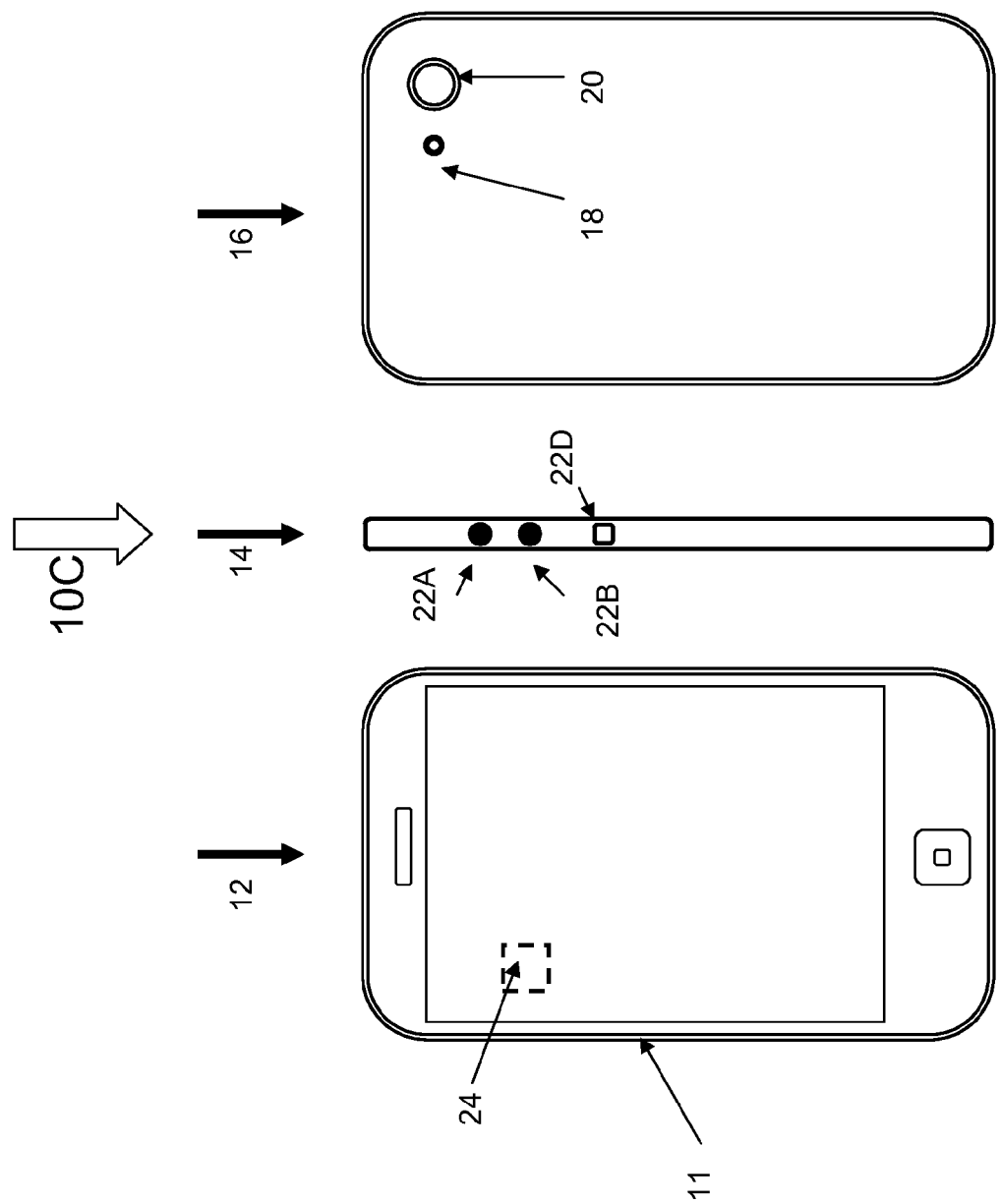

Three different embodiments 10A, 10B and 10C are disclosed with the help of FIGS. 1A, 1B, and 1C. Each of these embodiments has a device 11 that has been shown with a front view 12, a side view 14 and back view 16.

The back view 16 shows a LED light 18 and a camera lens 20 for a back facing camera. The light 18 and camera 20 are customarily positioned on the top end of the backside 16 of device 11.

Each of these embodiments depends on which of the plurality of mechanical switches on the bezel of the device 11 are used.

As illustrated in FIG. 1A, in embodiment 10A, the side view 14 shows a switch A 22A and a switch B 22B. These switches perform different functions when the device is in the ON state and when the device is in OFF state. These are the same pair of switches that are used for increasing and decreasing ringer volume when the device 11 is in the ON state.

In the embodiments described herein, the device 11 has logic 24 as shown in front view 12 of the device 10.

The logic 24 activates the LED light 18 with the help of either of the switches 22A and 22B. In prior art, these same switches 22A and 22B are used for other functions including for ringer/volume control. In the embodiments herein they are used for LED light 18 control while retaining their prior art functions.

FIG. 1B illustrates the second of these embodiments 10B. In this embodiment, instead of switches 22A and 22B, switch C 22C positioned on the top bezel is used.

FIG. 1C illustrates the third of these embodiments 100. In this embodiment, instead of switches 22A and 22B, a new switch D 22D positioned on the left bezel is used.

The logic 24 has two parts, called logic 24A and 24B. Logic 24A is used when the device 11 is in OFF state and Logic 24B is used when the device 11 is in the ON state. The functions of logic 24 are shown in FIGS. 2A and 2B and are also listed below:

Logic 24A
1. The logic 24A detects double quick switch activation on either switch A or switch B.
2. The logic 24A checks the device 11 is in an OFF state.
3. The logic 24A turns the LED light 18 to ON state.
4. The logic 24A, when LED light 18 is in ON state, detect switch A activation and increase LED light intensity from a prior intensity level.
5. The logic 24A, when LED light 18 is the ON state, detects switch B activation and decrease the LED light 18 intensity level.
6. The logic 24A saves the light intensity level in the memory associated with the logic 24A
7. The logic 24A uses the saved light intensity when LED light 18 light turned on in step 3. Alternatively, the logic 24A uses full light intensity of the LED light 18 when light 18 is turned ON in step 3.
8. The logic 24A detects double quick switch activations on either switch A or switch B.
9. The logic 24A turn the LED light 18 to an OFF state.

The functions of logic 24B are shown in FIG. 2B and are also listed below:

Logic 24B
1. The logic 24B detects double quick switch activations on either switch A or switch B.
2. The logic 24B de-activates other functions of switch A/B such as ringer/volume control.
3. The logic 24B checks device 11 is ON or active state and NOT in Camera Mode.
4. The logic 24B turns the LED light 18 to an ON state.
5. The logic 24B, when LED light 18 is in ON state, detects any switch A activations and increase light intensity of light 18
6. The logic 24B, when LED light 18 is an ON state, detects any switch B activations and decreases the light intensity level.
7. The logic 24B saves previous light intensity level.
8. The logic 24B uses the saved light intensity level when the LED light 18 is turned ON in step 3. Alternatively, the logic 24B uses full light intensity level of LED light 18 when light 18 turned on in step 3.
9. The logic 24B detects double quick switch activations on either switch A or switch B.
10. The logic 24B turns the LED light 18 to an OFF state.
11. The logic 24B activates switch A/B other functions such as ringer/volume control.

Figure 3A:
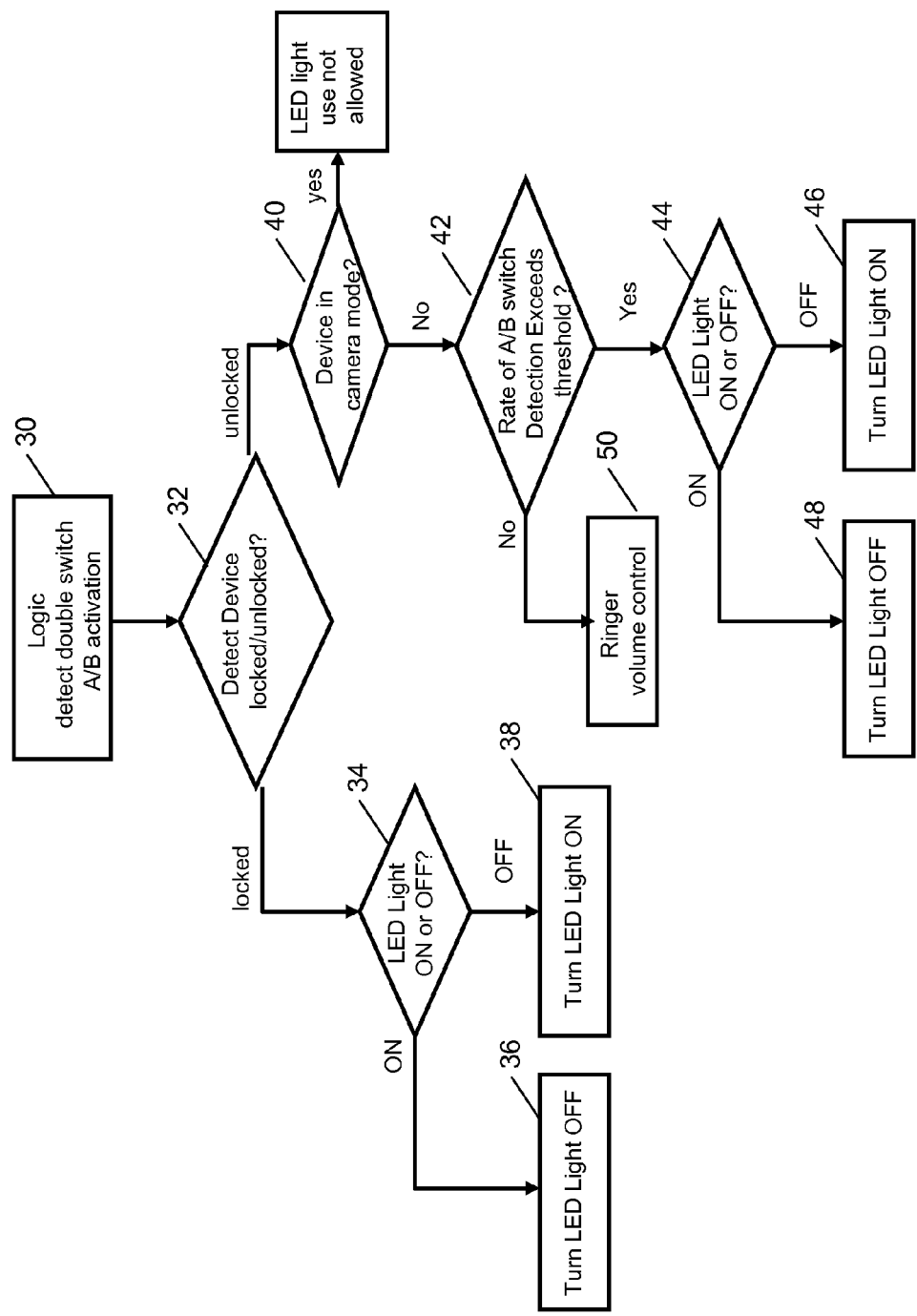
FIGS. 3A-3B are logic diagrams that illustrates features of a preferred embodiment of a one touch light logic.
Figure 3B:
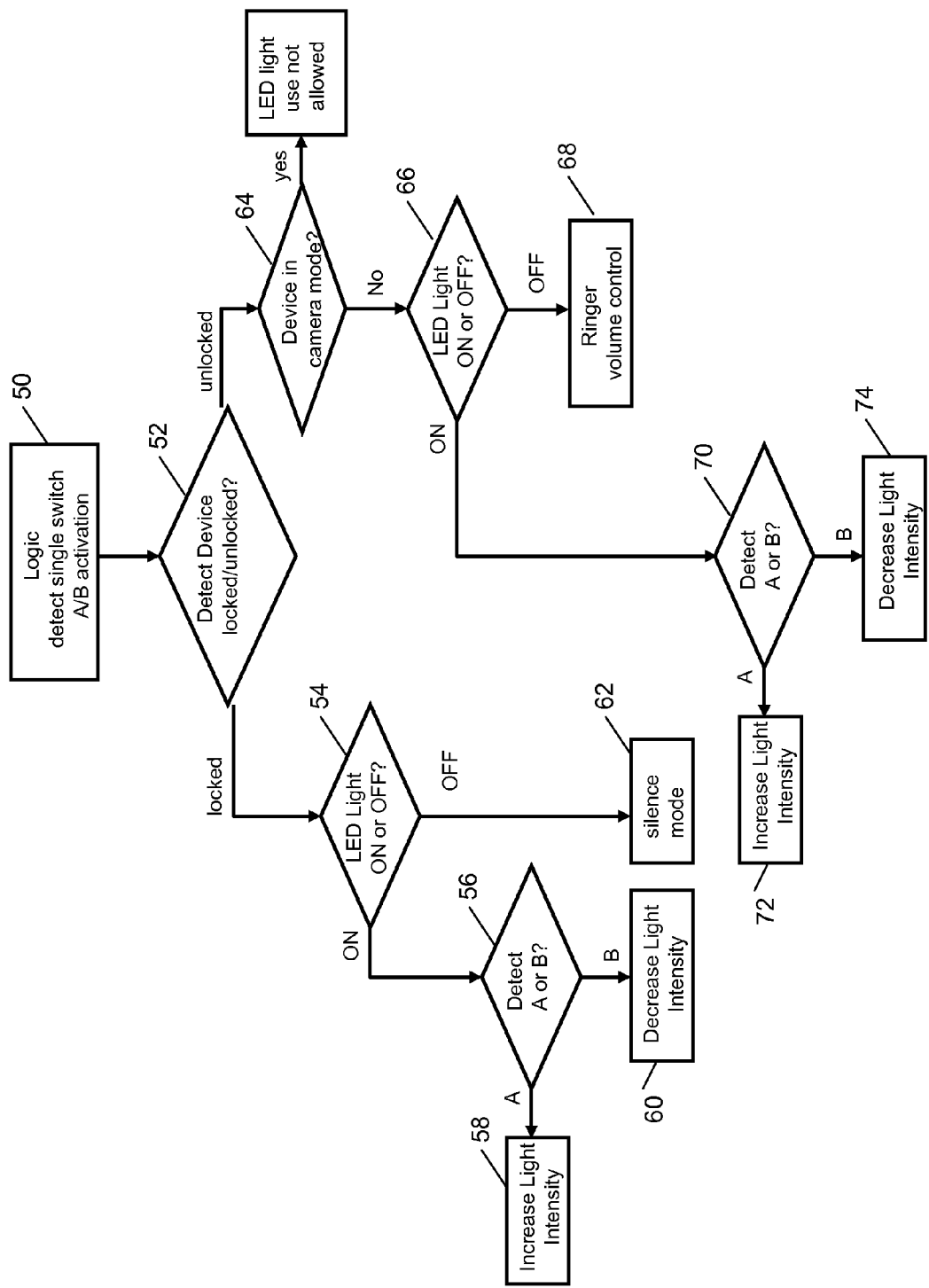

The details of logic 24 are further illustrated with the help of FIGS. 3A and 3B.

As shown in FIG. 3A, at step 30, the logic 24 detects double switch A/B activation. At step 32, logic detects if the device is in locked or unlocked state. If the device is in locked state, at step 34, the logic checks if the LED light is on or off. If the light is off, at step 38 the logic turns the light on. If the LED light is in on state, at step 36, the logic turns the LED light off.

If the device is in unlocked state, at step 40 the logic detects if the device is in camera mode. If the device is not in camera mode, the logic at step 42 determines rate of A/B switch activation exceeds a threshold. If the rate exceeds a threshold, at step 44, the logic checks if the LED light is on or off. If the light is off, the logic at step 46 turns the light on. If the LED light is in on state, at step 48, the logic turns the LED light off.

If the rate of switch A/B activation does not exceed a threshold, the switch A/B activations are used to control ringer volume.

As shown in FIG. 3B, at step 50, the logic 24 detects single switch A/B activation. At step 52, logic detects if the device is in locked or unlocked state. If the device is in locked state, at step 54, the logic checks if the LED light is on or off. If the light is on, the logic at step 56 detects if switch A or B was activated. If switch A was activated, at step 58, the logic increase light intensity, if not already on full intensity. If logic detects at step 56, that switch B was activated, the logic decreases LED light intensity from the current intensity level.

At step 54, if the LED light is off, at step 62, the logic puts the device in silence mode, a prior art function of the device 11.

If the device is in unlocked state, at step 64 the logic detects if the device is in camera mode. If the device is not in camera mode, the logic at step 66 checks if the LED light is on or off. If the light is on, the logic at step 70 detects if switch A or B was activated. If switch A was activated, at step 72, the logic increase light intensity, if not already on full intensity. If logic detects at step 74, that switch B was activated, the logic decreases LED light intensity from the current intensity level.

At step 66, if the LED light is off, at step 68, the logic puts the device in ringer volume control mode, a prior art function of the device 11.

For those knowledgeable in the art of logic programming would appreciate that the logic may be programmed differently without departing from the scope of the logic. For example, some duplicate branches may be merged to reduce the size of the programming instructions of the logic.

Figure 4A:
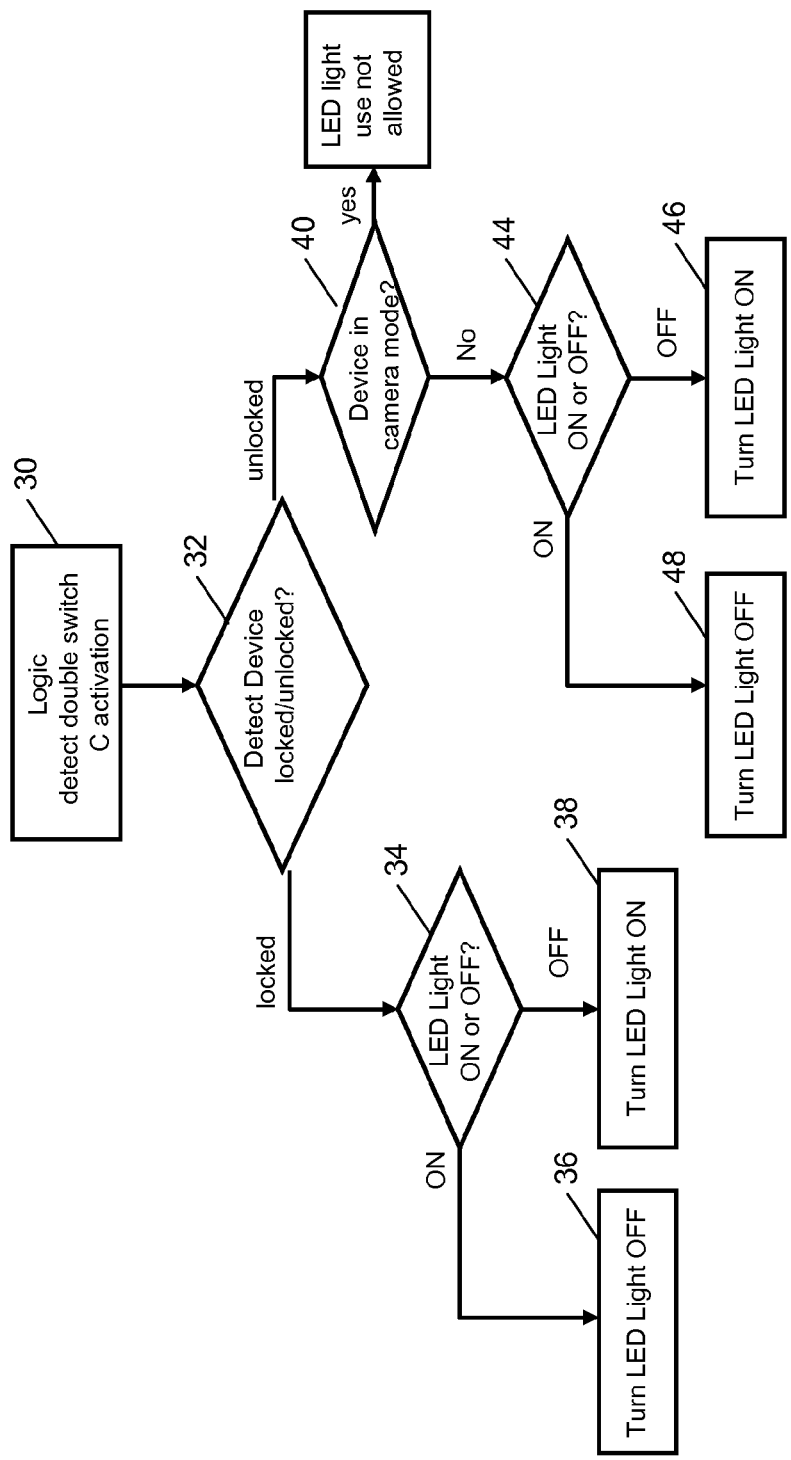
FIGS. 4A-4B are block diagrams that illustrates features of a preferred embodiment of a one touch light logic.

FIG. 4A illustrates the logic where switch 22C on the top of the bezel is used. Prior art use of the switch 22C in device 11 is used for turning the device on and off. Logic can distinguish quick double switch C activations and separate them from prior art use of such a switch on iPhone.

As shown in FIG. 4A, at step 30, the logic 24 detects double switch A/B activation. At step 32, logic detects if the device is in locked or unlocked state. If the device is in locked state, at step 34, the logic checks if the LED light is on or off. If the light is off, at step 38 the logic turns the light on. If the LED light is in on state, at step 36, the logic turns the LED light off.

If the device is in unlocked state, at step 40 the logic detects if the device is in camera mode. If the device is not in camera mode, the logic at step 42 determines rate of A/B switch activation exceeds a threshold. If the rate exceeds a threshold, at step 44, the logic checks if the LED light is on or off. If the light is off, the logic at step 46 turns the light on. If the LED light is in on state, at step 48, the logic turns the LED light off. If the rate of switch A/B activation does not exceed a threshold, the switch A/B activations are used to control ringer volume.

Figure 4B:
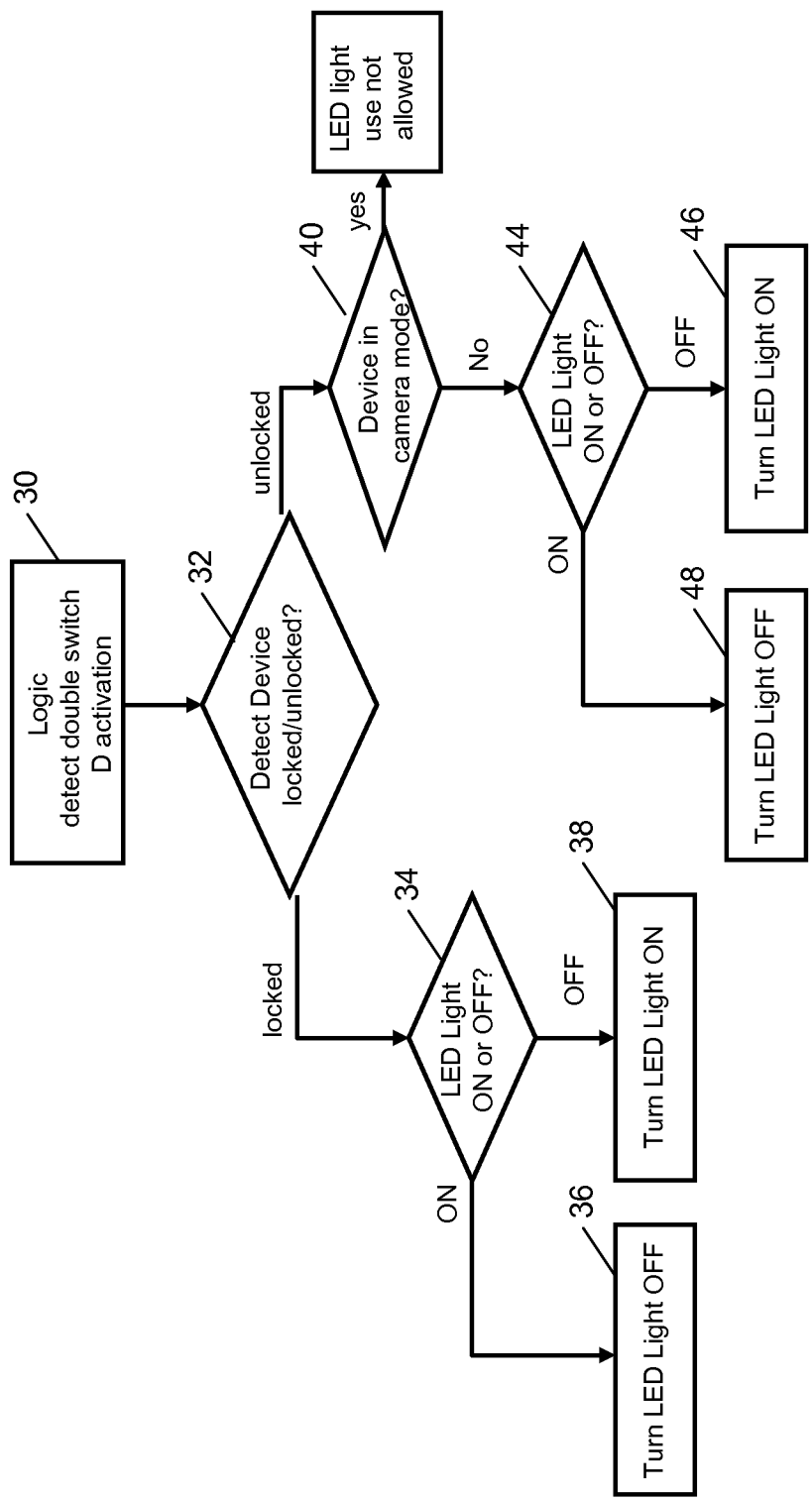

FIG. 4B illustrates the logic where switch 22D on the left bezel is used. Switch 22D may not be a prior art switch but may be added for the purpose of LED light control.

As shown in FIG. 4B, at step 30, the logic 24 detects double switch A/B activation. At step 32, logic detects if the device is in locked or unlocked state. If the device is in locked state, at step 34, the logic checks if the LED light is on or off. If the light is off, at step 38 the logic turns the light on. If the LED light is in on state, at step 36, the logic turns the LED light off.

If the device is in unlocked state, at step 40 the logic detects if the device is in camera mode. If the device is not in camera mode, the logic at step 42 determines rate of A/B switch activation exceeds a threshold. If the rate exceeds a threshold, at step 44, the logic checks if the LED light is on or off. If the light is off, the logic at step 46 turns the light on. If the LED light is in on state, at step 48, the logic turns the LED light off. If the rate of switch A/B activation does not exceed a threshold, the switch A/B activations are used to control ringer volume.

The technology of implementing software functions activated by a switch activation is prior art and is widely used in any number of mobile phone devices for activating functions in the mobile device. These functions may be standalone or integrated with the operating system as utility functions.

Further the technology of implementing software functions as above is also prior art and is used to detect switch activations based on time duration of switch activation and for a multiple switch activations in a limited time of the same switch, from a single switch activation.

These same prior art technologies are used in implementing the functions of logic 24 A and logic 24B as have been described above. The functions of logic 24A and 24B, in the device may be implemented in either firmware or software or a combination firmware and software.

Mode of Operation

It is assumed that a smart phone like device is such a useful device for many reasons the people keep it with them most of the time if not all the time. They keep it in their pocket book and keep it near their bed when asleep and are able to reach it or access it quickly. These many reasons include making and receiving voice calls, sending and receiving SMS, sending and receiving e-mail, listening to music, playing games, taking pictures and many other possible uses.

Following are some of many possible ways, as an illustration, how a user would use the device 11 and its LED light feature.

A person with device 11 is sitting in an aero plane and accidentally drops a small item between the seats. The person would quickly reach their device 11 and double click a button on the bezel of device 11 and the LED light would turn on. They could increase or decrease the intensity by the same switch and when the item is found, quickly switch off the LED light by a double tap on the same switch.

A person approaches his home at night and without a porch light turned on, cannot find the keys in the purse and the keyhole of the lock on the door of the house. The person would quickly reach their device 11 and by double tap of any switch on device 11 would have enough light to find the keys in the purse and be able to see the keyhole in the door to be quickly able to open the door of the house.

A person is at an unlighted place and needs to read something like their credit card number or a piece of paper with someone's address etc. The person quickly reaches for their device 10, activates the LED light and accomplish their purpose.

These above modes of operation of the embodiments described herein are merely illustrative and users may find any number of new and different ways to use the LED light of a smart phone that meant to be used for a camera flash in any number of new and different ways.

A handheld portable device is a smart phone that has switch that is positioned on the bezel of the device. The device has a LED light used for flash light in a camera mode of the device. Logic in the device detects activation of the switch and uses the switch activation to control the LED light; thereby the logic enables quick response use of the LED light for security purposes.

Quick double switch activation turns the LED light on and when the light is in ON state, quick double switch activations turns the LED light off. When the light is in ON state, single switch activation increases the light intensity if not at full level and if at full intensity, decreases the light intensity.

A security feature in a handheld electronic wireless communication device, has two switch buttons A and B that are positioned on the bezel of the device that are for increasing/decreasing functions of the device. The device has a LED light used for flash light in a camera mode of the device. A logic in the device, the logic in an non-active state of the device, detects activations of the two switches in the non-active state of the device and uses the switch activations to control the LED light; thereby the logic enables quick response use of the LED light for security purposes.

The logic with quick double switch activation on either switch A or switch B turns the LED light on. The logic when the light is in ON state, quick double switch activations on either switch A or switch B turns the LED light off.

The logic when the light is in ON state, switch A activation increases the light intensity and switch B interaction decreases the light intensity.

The logic saves the last intensity in the memory associated with the logic. The logic uses the saved intensity to turn the lights on. Alternatively the logic the LED light is turned on at full intensity.

A security feature in a handheld electronic wireless communication device, has the device has two switch buttons A and B that are positioned on the bezel of the device that are for increasing/decreasing functions of the device. The device has a LED light used for flash light in a camera mode of the device.

A logic in the device that when the device is in an active state, without the camera function being selected, the logic detects quick double activations of any of the two switches on the device in an active state, turns off the ringer/volume control off and uses these quick double activations to control the LED light, thereby rapidly use the device in a light on/off mode for security purposes.

When the LED light 18 is in OFF state, the logic reactivates prior art functions of switch A/B Method of Operation As illustrated in FIG. 5A, a method for LED light operation in a wireless mobile device has the following steps, where all the steps may not be used or used in the order specified.

At step 80, having two switch buttons A and B on the device and positioning them on the bezel of the device for use in increasing/decreasing functions of the device.

At step 82, having an LED light in the device used for flash light in a camera mode of the device.

At step 84, having logic in the device, the logic in a non-active state of the device, detecting activations of the two switches in the non-active state of the device and using the switch activations to control the LED light, thereby enabling quick response use of the LED light for security purposes in the device.

At step 86, performing quick double switch activations with either switch A or switch B for turning the LED light on.

At step 88, performing quick double switch activations on either switch A or switch B, when the light is in ON state, for turning the LED light off.

At step 90, increasing the light intensity on switch A activation and decreasing the light intensity on switch B activation, when the light is in ON state.

At step 92, saving by the logic the last intensity in the memory associated with the logic.

At step 94, using by the logic the saved intensity to turn the lights on.

At step 96, turning the LED light on at full intensity.

At step 98, a logic in the device that when the device is in an active state, without the camera function being selected, the logic detects quick double activations of any of the two switches on the device in an active state, turns off the ringer/volume control off and uses these quick double activations to control the LED light, thereby rapidly use the device in a light on/off mode for security purposes.

A method for handheld portable device, as illustrated in FIG. 5B, has the steps, where all the steps may not be used or used in the order specified:

At step 100, positioning a switch on the bezel of the device such as a smart phone.

At step 102, having by the device a LED light used for flash light in a camera mode of the device.

At step 104, detecting activation of the switch by a logic using the switch activation to control the LED light a logic in the device, thereby the logic enabling quick response use of the LED light for security purposes.

At step 106, turning the LED light on by quick double switch activations.

At step 108, turning the LED light off, by quick double switch activations, when the light is in ON state.

In summary, the preferred embodiments are for a security feature in a handheld electronic wireless communication device that has two prior art switch buttons A and B that are positioned on the bezel of the device and that are used for increasing/decreasing functions of the device and the device has a prior art LED light used for flash light in a camera mode of the device.

In such a prior art device as above, a device-logic, in a non-active state of the device, detects activations of the two switches in the non-active state of the device and uses the switch activations to control the LED light; thereby the logic enables quick response use of the LED light for security purposes. The same is true for the switch activations when the device is in the ON state, thus providing a simplified and a single touch control of the LED light of the device making the device useful for security purposes where quick access to light is desired.

While the particular invention, as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A handheld electronic wireless communication device, comprising:
   a. the handheld electronic wireless communication device has a first switch and a second switch that are positioned on a bezel of the handheld electronic wireless communication device that are for increasing/decreasing functions of the handheld electronic wireless communication device;
   b. the handheld electronic wireless communication device has a LED light used for a flash light in a camera mode of the handheld electronic wireless communication device;
   c. a logic in the handheld electronic wireless communication device, the logic in a non-active state of the handheld electronic wireless communication device, detects activations of the two switches and uses the switch activations to control the LED light; and enables quick response use of the LED light for security purposes;
   d. the logic detects successive activations exceeding a threshold of any of the two switches on the handheld electronic wireless communication device and uses these successive activations to control the LED light, rapidly using the device in a LED light on/off control mode for security purposes and when the LED light is in an ON state, a single activation of the switches increases or decreases the light intensity.

2. The handheld electronic wireless communication device as in claim 1, wherein:
   the logic in the handheld electronic wireless communication device that when the handheld electronic wireless communication device is in an active state, without the camera mode being selected, the logic detects the successive activations exceeding a threshold of any of the two switches on the handheld electronic wireless communication device and uses these successive activations to control the LED light, rapidly using the device in a LED light on/off control mode for security purposes.

3. The handheld electronic wireless communication device as in claim 2, wherein:
   a. the successive switch activation on either the first switch or the second switch turns the LED light on;
   b. when the light is in ON state, the successive switch activations exceeding a threshold on either the first switch or the second switch turns the LED light off.

4. The handheld electronic wireless communication device as in claim 3, wherein:
   a. the logic saves a last LED light intensity in a memory associated with the logic;
   b. the logic uses the last saved LED light intensity to turn the LED light on in that intensity.

5. The handheld electronic wireless communication device as in claim 2, wherein:
   the LED light is turned on at full intensity.

6. The handheld electronic wireless communication device as in claim 1, wherein:
   a. the successive switch activation exceeding a threshold on either the first switch or the second switch turns the LED light on;
   b. when the light is in ON state, the successive switch activations exceeding a threshold on the first switch or the second switch turns the LED light off.

7. The handheld electronic wireless communication device as in claim 6, wherein:
   a. the logic saves a last LED light intensity in a memory associated with the logic;
   b. the logic uses the last saved LED light intensity to turn the LED light on in that intensity.

8. The handheld electronic wireless communication device as in claim 1, wherein:
   the LED light is turned on at full intensity.

9. A method for a security feature in a handheld electronic wireless communication device, comprising the steps of:
   a. positioning a first switch and a second switch on a bezel of the handheld electronic wireless communication device for use in increasing/decreasing functions of the handheld electronic wireless communication device;
   b. positioning an LED light in the handheld electronic wireless communication device used for flash light in a camera mode of the handheld electronic wireless communication device;
   c. detecting by a logic in the handheld electronic wireless communication device, in an non-active state of the handheld electronic wireless communication device, activations of the two switches and using the switch activations to control the LED light, for quick response use of the LED light for security purposes in the handheld electronic wireless communication device;
   d. detecting by the logic successive activations exceeding a threshold of any of the two switches on the handheld electronic wireless communication device and using these successive activations to control the LED light, rapidly using the device in a LED light on/off control mode for security purposes and when the LED light is in an ON state, increasing or decreasing the light intensity by a single activation of the switches.

10. The method for the handheld electronic wireless communication device as in claim 9, further comprising the steps of:
    detecting by the logic in the handheld electronic wireless communication device that when the handheld electronic wireless communication device is in an active state, without the camera mode being selected, the successive activations of any of the two switches on the handheld electronic wireless communication device in the active state, and using these successive activations exceeding a threshold for controlling the LED light, for rapidly using the device in a light on/off control mode for security purposes.

11. The method as in claim 9, further comprising the steps of:
    a. performing the successive switch activations exceeding a threshold on either the first switch or the second switch for turning the LED light on;
    b. performing the successive switch activations exceeding a threshold on either the first switch or the second switch, when the LED light is in an ON state, for turning the LED light off.

12. The method as in claim 11, further comprising the steps of:
    a. saving by the logic a last LED light intensity in a memory associated with the logic;
    b. using by the logic the last saved LED light intensity to turn the LED light on.

13. The method as in claim 9, further comprising the step of:
    turning the LED light on at full intensity.

14. A handheld portable device, comprising:
    a. the handheld portable device is a smart phone that has a first switch and a second switch that are positioned on a bezel of the handheld portable device;
    b. the handheld portable device has a LED light used for flash light in a camera mode of the handheld portable device;
    c. a logic in the handheld portable device detects activation of either the first switch or the second switch and uses the switch activation to control the LED light for quick response use of the LED light for security purposes;
    d. the logic detects successive activations exceeding a threshold of any of the two switches on the handheld electronic wireless communication device and uses these successive activations to control the LED light, rapidly using the device in a LED light on/off control mode for security purposes and when the LED light is in an ON state, a single activation of the switches increases or decreases the light intensity.

15. The handheld portable device as in claim 14, wherein:
    a. the logic in the handheld portable device, the logic in an non-active state of the handheld portable device, detects the successive activations of the two switches in the non-active state of the handheld portable device and uses the successive switch activations to control the LED light for quick response use of the LED light for security purpose;
    b. the logic in the handheld portable device that when the handheld portable device is in an active state, without the camera mode being selected, the logic detects the successive activations exceeding a threshold of any of the two switches on the handheld portable device in the active state, and uses these successive activations exceeding a threshold to control the LED light, in a light on/off control mode for security purposes.

16. The handheld portable device as in claim 14, wherein:
a. the successive switch activation exceeding a threshold turns the LED light on;
b. when the LED light is in ON state, the successive switch activations exceeding a threshold turns the LED light off.

* * * * *